United States Patent [19]

Beyërsbergen van Henegouwen et al.

[11] Patent Number: 4,621,297

[45] Date of Patent: Nov. 4, 1986

[54] CASSETTE WITH COVER LATCHES CONTROLLING THE COVER OPENING DIRECTION

[75] Inventors: Cornelis M. Beyërsbergen van Henegouwen; Karel G. M. Koken; John C. J. Olierook, all of Eindhoven, Netherlands

[73] Assignee: U.S. Philips Corporation, New York, N.Y.

[21] Appl. No.: 598,635

[22] Filed: Apr. 10, 1984

[30] Foreign Application Priority Data

Nov. 17, 1983 [NL] Netherlands .................. 8303943

[51] Int. Cl.⁴ ............... G11B 23/02; G11B 15/32; G11B 23/04; G03B 1/04
[52] U.S. Cl. .......................... 360/132; 360/85; 360/95; 242/199; 206/387; 220/1 A
[58] Field of Search ............... 360/132, 85, 95; 242/198, 199; 220/1 A; 206/387

[56] References Cited

U.S. PATENT DOCUMENTS

| | | | |
|---|---|---|---|
| 3,980,255 | 9/1976 | Serizawa | 242/199 |
| 4,234,140 | 11/1980 | Van Nie et al. | 360/132 |
| 4,235,395 | 11/1980 | Wardenaar et al. | 360/132 |
| 4,302,787 | 11/1981 | Itani | 360/85 |
| 4,389,690 | 6/1983 | Oishi et al. | 242/199 |
| 4,449,677 | 5/1984 | Ohta et al. | 360/132 |
| 4,475,700 | 10/1984 | MacLeod, Jr. et al. | 242/199 |
| 4,496,119 | 1/1985 | Sieben | 242/199 |
| 4,504,028 | 3/1985 | Goto | 360/132 |

Primary Examiner—John H. Wolff
Assistant Examiner—Alfonso Garcia
Attorney, Agent, or Firm—David R. Treacy

[57] ABSTRACT

The cover of a cassette such as a magnetic tape cassette is pivoted in either of two opposite directions to open positions about a single axis. To latch the cover, adjacent each side wall of the cassette there is a cover flange having a circular slot concentric with the pivot axis, the slots in the two flanges extending in opposite directions and overlapping at ends which, in the closed cover position, are aligned with latching projections on the cassette housing. By moving one latching projection out of its slot, the cover is free to pivot in the direction in which the other projection engages the slot at its end. In a flip-over reversible cassette, one unlatching member on the apparatus will engage the correct latching projection, depress and release it, so as to permit the cover to open only the correct direction. When the cover is fully opened, the projection may be permitted to be reinserted, into a recess provided for that purpose.

20 Claims, 10 Drawing Figures

CASSETTE WITH COVER LATCHES CONTROLLING THE COVER OPENING DIRECTION

BACKGROUND OF THE INVENTION

The invention relates to a cassette with a pivotal cover; and more particularly, for example, to a magnetic-tape cassette provided with a housing which comprises two substantially parallel major walls, each having two openings for the passage of drive spindles of a magnetic-tape-cassette apparatus, two substantially parallel side walls, a rear wall, an end or front wall along which a magnetic tape extends, and a cassette cover. The cover has a major portion which, when the cover is in the closed position, covers the part of the magnetic tape which extends along the front wall, and cover flanges which are situated one on each side of the major portion adjacent the side walls and which are pivotally connected to the side walls. The cassette cover is pivotable about a pivotal axis which extends perpendicularly to the side walls, from the closed position to two different open positions; that is, a first open position in which the major portion is situated near a first major wall and a second open position in which said major portion is situated near a second major wall. The cassette also has latching means for latching the cassette cover in the closed position.

A magnetic-tape cassette of this general type is disclosed in Netherlands Patent Application No. 165598 to which U.S. Pat. No. 4,235,395 corresponds. This cover pivots about either of two axes depending on the pivoting direction. The front cover of this known magnetic-tape cassette is latched in the closed position by a spring-loaded slide which is slid onto the housing. This slide is slidable in a direction perpendicular to the front wall of the housing and has two funnel-shaped recesses which position projections on the cover flanges in an end position of the slide and thus act as latching means to latch the cassette cover in the closed position. In order to release the cassette cover the slide must be slid away from the front wall of the housing. This movement can be performed in a reliable manner only by simultaneously exerting pressure on the slide at two locations near the two side walls of the housing. For this movement of the slide, and hence for unlatching the cassette cover, a comparatively bulky mechanism is required on the magnetic-tape-cassette apparatus. Correct cooperation with the actuating mechanism requires that the known cassette is preferably inserted into the apparatus with the front wall facing the apparatus.

SUMMARY OF THE INVENTION

It is the object of the invention to enable the cassette cover of such a magnetic-tape cassette to be unlatched at a location near only one side wall of the housing.

According to the invention on the side facing the adjacent side wall each of the cover flanges is provided with a slot which is concentric with the pivotal axis, in a plane perpendicular to the pivotal axis of the cassette cover. The slots in both cover flanges are disposed substantially mirror-symmetrically relative to each other, and first end portions of the slots overlap each other. The latching means comprise two spring-loaded latching projections which are situated near a first and a second side wall, respectively and are movable into and out of the respective adjacent slot in a direction substantially perpendicular to the side walls, and therefore parallel to the axis. In the closed position the latching projections are each situated in a first end portion of a slot and together keep the cover latched.

The cassette cover can be unlatched by moving one of the latching projections out of the corresponding slot. Since the other latching projection can now slide freely along its corresponding slot, the cassette cover can now be pivoted in one direction towards an open position. For swinging the cover into the other open position, the other latching projection merely has to be moved out of the corresponding slot, after which the first-mentioned latching projection slides along its associated slot. In the latched position the two latching projections, which are then each situated in an end portion of the associated slot, ensure that a stable latching is obtained.

Thus, for unlatching the cassette cover of a magnetic-tape cassette in accordance with the invention, it is sufficient to actuate the one latching projection corresponding to the direction in which the cover must be pivoted. This enables the magnetic-tape cassette to be used in magnetic-tape-cassette apparatus in which room for unlatching the cassette cover is available at only one location inside the apparatus. This is the case, for example, in an apparatus into which the cassette should be inserted with one of the side walls facing the apparatus. It is then also of advantage that the cover can be opened in such a manner that in the open position it occupies only a small amount of additional space adjacent the relevant major wall. A further advantage is that for latching the cassette cover a simple construction comprising only a few parts is required, so that this construction is particularly suitable for mass-manufactured magnetic-tape cassettes.

It is to be noted that United States Patent Specification No. 4,302,787 proposes a magnetic-tape cassette comprising cover flanges with slots which engage projections. However, these projections do not latch the cassette cover of this magnetic-tape cassette. Rather they limit the pivotal movement of the cover towards the open position, and urge the cover towards the closed position through a spring construction.

A preferred embodiment of the invention is characterized in that each slot covers an arc of circle of approximately 90°, and a second end portion of the slot limits the pivotal movement of the cassette cover towards the first or the second open position. Thus, after the first latching projection has been moved out of the relevant slot the cassette cover can be pivoted in such a manner, unimpeded by the second latching projection, that in the open position the major portion of the cassette cover extends substantially parallel to the adjacent major wall.

In this respect another preferred embodiment of the invention is characterized in that each cover flange has a recess which is disposed substantially diametrically opposite the second end portion of the slot. In either of the open positions of the cassette cover, a latching projection engages the corresponding recess to latch the cover in this position. This step ensures that the cassette cover is in a stable position when it is open. Consequently, the magnetic-tape-cassette apparatus need not be provided with means for keeping the cover in the open position.

Yet another preferred embodiment of the invention is characterized in that each latching projection is situated near the free end of a resilient tab which is connected to the relevant side wall, and is movable in the slot under the spring force exerted by the tab. This simplifies the construction of the latching projections, which can be manufactured integrally with the side wall of the housing.

A simple lateral actuation of the latching projection is then possible if each tab is provided with an actuating element which projects from a plane tangent to the side wall.

A magnetic-tap cassette in accordance with the invention will be described in more detail, by way of example, with reference to the drawing.

DESCRIPTION OF THE PREFERRED EMBODIMENT

Figure 1:
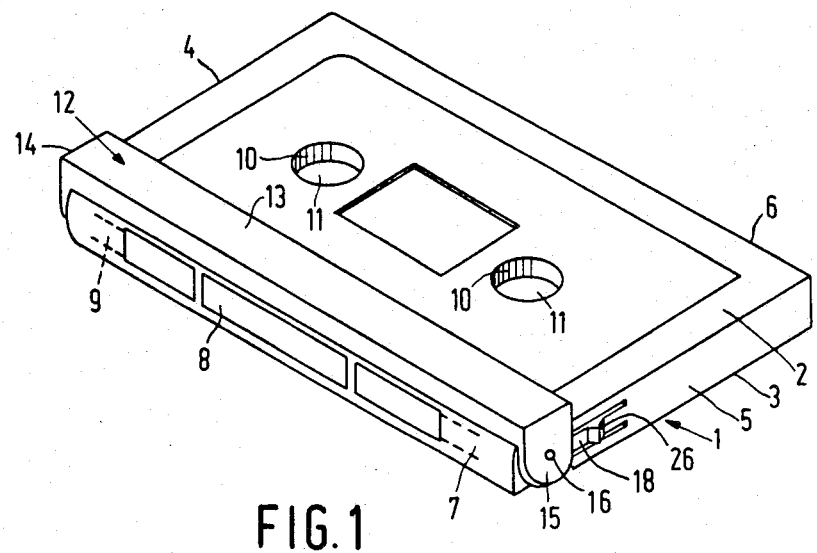
FIG. 1 is a perspective view of a magnetic-tape cassette in accordance with the invention.
Figure 2:
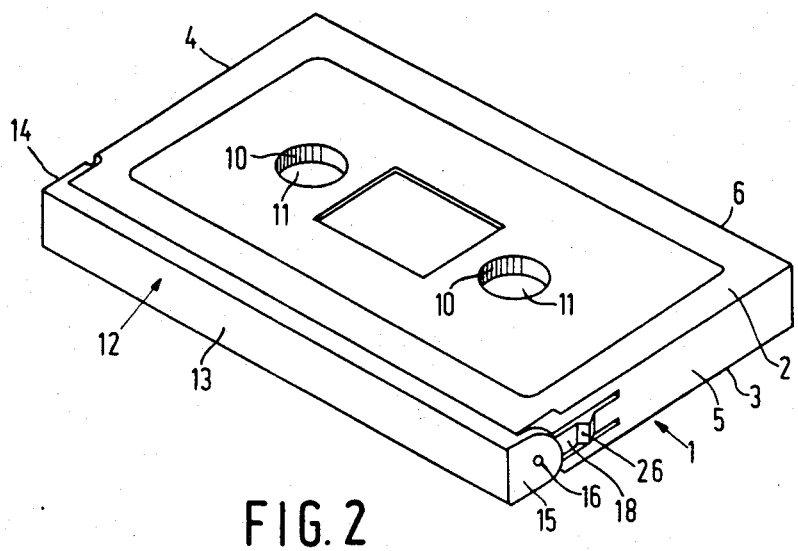
FIG. 2 is a perspective view of the cassette shown in FIG. 1, the cassette cover being shown in a closed position.

As is shown in FIGS. 1 and 2 the magnetic-tape cassette in accordance with the invention comprises a housing having two substantially parallel rectangular major walls 2 and 3. The housing 1 further comprises two substantially parallel rectangular side wall 4 and 5, a rear wall 6, and an end or front wall 7 which extends parallel to this rear wall. The front wall 7 is formed with three front openings 8, a magnetic tape 9 being stretched in the area behind the front openings 8 along the front wall 7 to cooperate with parts, not shown, of a magnetic-tape-cassette apparatus. These parts are magnetic heads, a pressure roller and a capstan. In a manner not shown the magnetic tape 9 is wound on two hubs 10 which are mounted for rotation between the two major walls 2 and 3. For driving the hubs 10 to transport the tape, two circular openings 11 are formed in both the major wall 2 and the major wall 3. Drive spindles, not shown, of a magnetic-tape-cassette apparatus can pass through the openings 11. This construction of the cassette in accordance with the invention may be compared with the customary construction of the so-called compact cassette.

Figure 4:
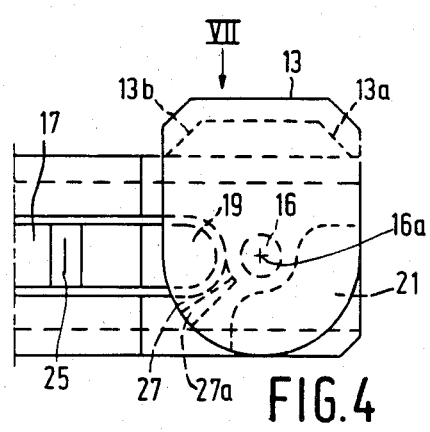
FIG. 4 shows the left-hand side wall with the cassette cover in a first open position.
Figure 5:
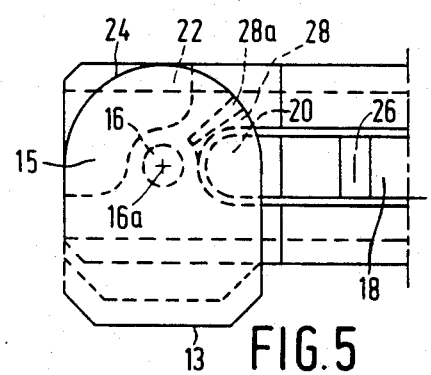
FIG. 5 shows the right-hand side wall with the cassette cover in a second open position.
Figure 7:
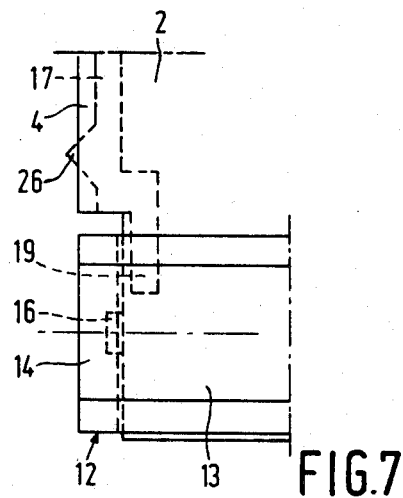

The cassette in accordance with the invention further comprises a cassette cover 12, which has a major portion 13 which, in the closed position of the cover, as shown in FIG. 2, covers the part of the magnetic tape 9 which extends along the end or front wall 7. On each side of the major portion 13 the cover 12 comprises a cover flange 14 or 15, which cover flanges are situated adjacent the side walls 4 and 5 respectively and are pivotally connected to the side walls by means of pins or journals 16 on these side walls. The common axis 16a of the journals 16 forms the pivotal axis of the cassette cover and extends perpendicularly to the side walls 4 and 5. By pivoting the cassette cover about the pivotal axis 16a it can be moved to a first open position as shown in FIGS. 2, 4 and 7 or into a second open position as shown in FIG. 5.

In each of the side walls 4 and 5 a resilient tab 18 is formed which extends in the longitudinal direction parallel to the major walls 2 and 3 and which is integral with the cassette housing. The end facing the rear wall 6 is connected to the side wall. As a result of the choice of the material of the housing the tab has resilient properties, a projection 19 and 20 respectively being formed on the end of the tab 17 or 18 which faces the front wall 7. Under the influence of the movement of the corresponding tab 17 or 18 the projection 19 or 20 is movable substantially perpendicular to the relevant side wall. The tab tends to urge the projection against the adjacent side of the associated cover flange.

Figure 3A:
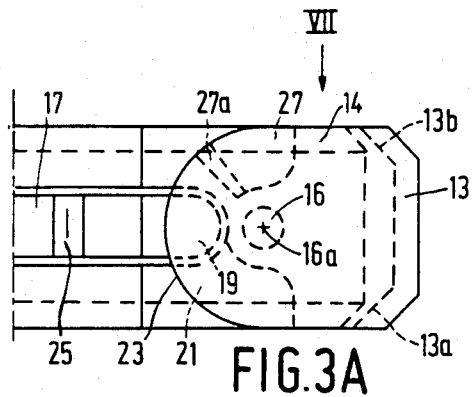
FIGS. 3a and 3b are enlarged-scale side views of the left-hand and the right-hand side wall respectively and the adjacent cover flange.
Figure 3B:
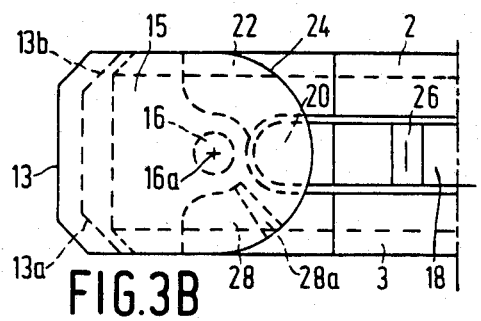
Figure 6:
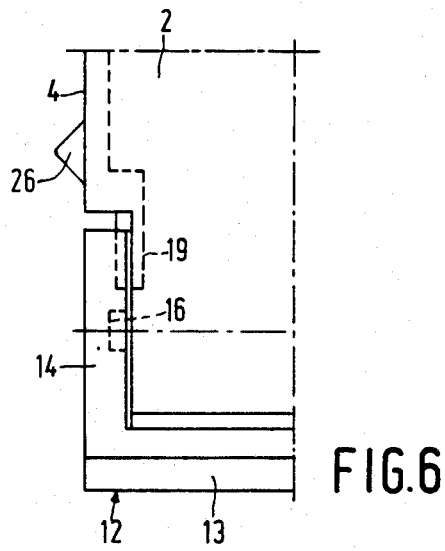
FIG. 6 is a plan view taken on the line VI in FIG. 3a, FIG. 7 is a plan view taken on the line VII in FIG. 4.

In the closed position of the cassette cover 12 each projection 19 or 20 engages a first end portion of a slot 21 or 22 in the respective cover flange 14 or 15. The slots 21 and 22 are concentric with the pivotal axis 16a and extend up to the edge portion 23 or 24 of the cover flange viewed in a radial direction. This edge portion is semicircular. As is shown in FIGS. 3a and 3b oblique edge portions 13a and 13b of the major portion 13 preferably abut effectively with front edges of the major walls 2 and 3 respectively in the closed position of the cover. In the closed position the cassette cover is latched by the action of the projections 19 and 20, which function as latching projections. This is possible since, with respect to a plane perpendicular to the pivotal axis 16a the slots 21 and 22 are arranged mirror-symmetrically relative to each other, the first end portions of the slots overlapping each other (compare FIGS. 3a and 3b). The projection 19 abuts with the end of the first end portion of the slot 21, while the projection 20 abuts with the end of the end portion of the slot 22, thereby ensuring a stable positioning of the cassette cover 12. Owing to the mirror-symmetrical arrangement of the slots 21 and 22 it is possible to pivot the cassette cover 12 into one of the open positions by pressing only the proper one of the projections inwards. For actuating the projections, the tabs 17 and 18 are provided with actuating elements 25 and 26 which as shown in particular in FIGS. 6 and 7 project from a plane tangent to the relevant side wall. By pressing the actuating element 25 or 26 inwards in the magnetic-tape-cassette apparatus the relevant projection 19 or 20 is moved out of the respective slot 21 or 22. As a result of this, the cover 12 can pivot to the first open position as shown in FIG. 4, the projection 20 sliding freely in the slot 22. Alternatively the projection 20 can be moved inwards, the projection 19 sliding in the slot 21 to pivot the cover into the second open position as shown in FIG. 5. In this respect it is of advantage that each slot covers an arc circle of approximately 90°, so that a second end portion of the slot limits the pivotal movement of the cover towards the relevant open position. Moreover, it is advantageous that the inner wall of each cover flange be formed with a recess 27 or 28 which is situated substantially diametrally opposite the second end portion of the slot. This recess can engage the relevant projection 19 or 20 when the cover 12 is swung into the first or the second open position. In this way the cover is latched effectively in the open positions. To facilitate this movement each recess 27 or 28 is bounded by an oblique wall portion, 27a and 28a respectively.

The cassette cover 12 in the magnetic-tape cassette in accordance with the invention has the advantage that a stable latching in the closed positions of the cover is obtained, while depressing only one of the actuating elements 25 or 26 is sufficient to release the cover 12 in the desired direction. This of special advantage in reversible cassettes which can be placed onto the apparatus in one of two attitudes, with either the major wall 2 with the major wall 3 aligned to cooperate with the drive spindles of the apparatus.

A further advantage is that the housing 1 may have a symmetrical construction and that on the housing, of which the tabs 17 and 18 with the projections 19 and 20 form an integral part, only one additional part has to be mounted, namely the cassette cover 12. When the relevant actuating element 25 or 26 is pressed inwards it is always ensured that the cover can pivot in one direction only, so that no undesired movements of the cover are possible. The space occupied by the cover in the open position above or below the housing respectively is small, so that in the apparatus only a comparatively small space is necessary for the movement of the cover to the first or the second open position.

Figure 8:
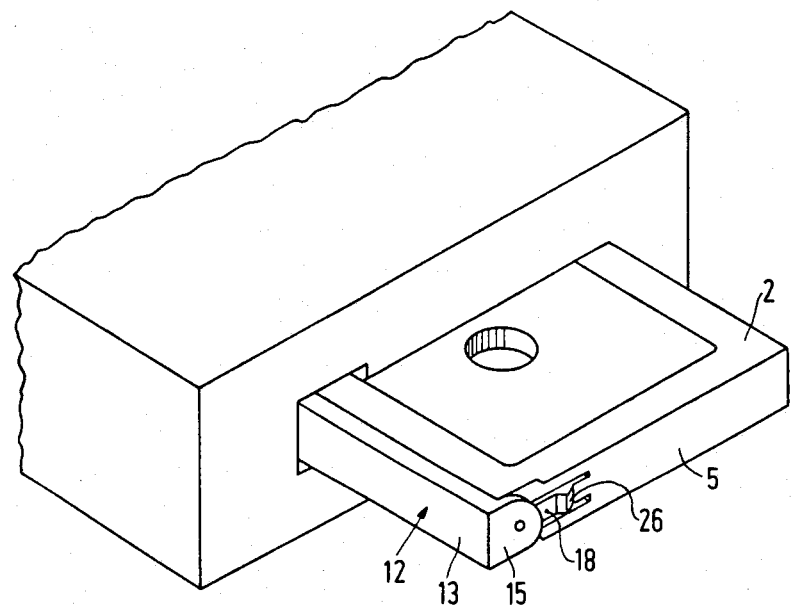
FIG. 8 is a perspective view of the magnetic-tape cassette in accordance with the invention, partly inserted in a magnetic-tape-cassette apparatus.
Figure 9:
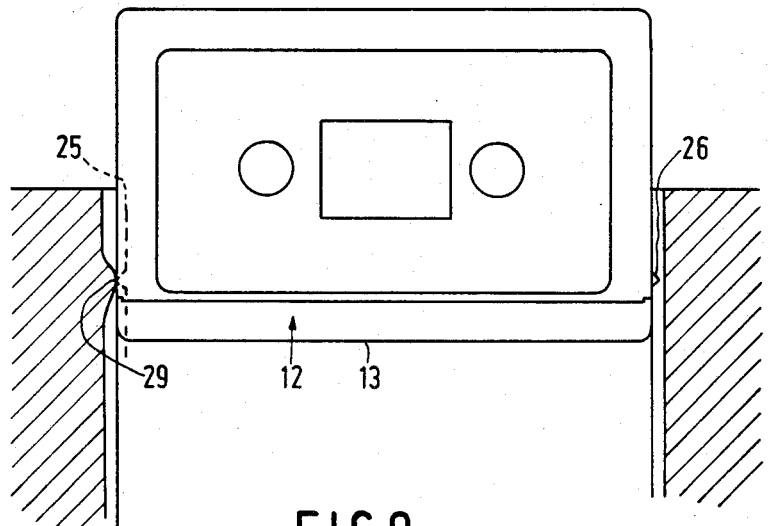
FIG. 9 is a perspective view of the magnetic-tape cassette in accordance with the invention, partly inserted in a different magnetic-tape-cassette apparatus.

The cassette shown may be employed, for example, for digital audio recording on magnetic tapes, for which purpose the housing must be sealed correctly against the penetration of dust and other contaminants when the cassette is not in use. As is shown in FIGS. 8 and 9, the cassette in accordance with the invention can be inserted into a magnetic-tape-cassette apparatus in various positions of the cassette. As is visible in FIG. 8, this may be effected by inserting the cassette with the side wall 4 facing the apparatus, a stop on the apparatus urging the actuating element 26 inwards, thereby causing the projection 19 to move out of the slot 21. After this the cover 12 can be swung into the first open position in the apparatus. This is particularly suitable for equipment used in cars, in which the cassette is generally inserted in this way. FIG. 9 shows that the cassette can also be inserted with a long side facing a magnetic-tape-cassette apparatus, the relevant actuating element 25 being actuated on one side only, for example by means of a run-on projection 29. During passage of the projection 29 the cover can be swung into the relevant open position.

What is claimed is:

1. A cassette comprising a housing having an end and first and second side walls, a cover which in a closed position at least partly covers said end, means for pivotally connecting said cover to said housing to open by pivotal movement about a single axis only in each of two opposite directions from said closed position, and means for latching the cover in the closed position, wherein said means for latching comprises a first latching projection arranged for cooperation with a first slot, adjacent said first side wall, and a second latching projection and corresponding second slot adjacent said second side wall, each said latching projection being movable into and out of the respective slot in a direction generally parallel to said axis, from an inserted position to an unlatched position, said slots each being concentric about said axis and each extending from a respective first end to a respective second end, arranged such that in the closed position of the cover each latching projection is aligned with the first end of the respective slot, and the slots extend in opposite angular directions about said axis, whereby when the cover is in the closed position and the projections are each in the inserted position, the cover is latched against pivoting in either direction, and when the first latching projection is moved to its unlatched position the cover is free to open in the first direction only, the second latching projection and its respective slot being relatively movable between the respective first and second ends; and when only the second latching projection is moved to its unlatched position the cover is free to open in the second direction only.

2. A cassette as claimed in claim 1, wherein each latching projection is resiliently connected to the housing and is biased toward the inserted position; and each slot is part of a respective flange of the cover.

3. A cassette as claimed in claim 2, wherein each flange further comprises a recess angularly spaced from the respective first end in a direction opposite the respective slot, arranged such that when the cover is fully opened in the first direction the first latching projection is aligned with the corresponding recess, and upon movement of the first latching projection to the inserted position, the cover is latched open; and when the cover is fully opened in the second direction, the second latching projection is aligned with its corresponding recess, and upon movement of the second latching projection to the inserted position, the cover is latched open.

4. A cassette as claimed in claim 3, wherein each respective latching projection is moved from its inserted to its unlatched position by depressing it inward.

5. A cassette as claimed in claim 3, wherein said cassette is mirror-symmetrical about two major walls which extend from said end wall and between said side walls, the cassette can be inserted into an apparatus in either of first and second attitudes symmetrical about said axis, in the first attitude the first latching projection being in a position for engagement with an unlatching member on the apparatus, and in the second attitude said second latching projection being in a position for engagement by said member, whereby upon insertion of the cassette into said apparatus in either attitude, upon unlatching by operation of the member the cover is openable in the same direction with respect to the apparatus.

6. A cassette as claimed in claim 4, wherein each slot extends over an arc of approximately 90°, so that the cover can open by approximately 90° movement in either direction, each recess being diametrically opposite the respective second end of the slot.

7. A cassette as claimed in claim 1, wherein said cassette is mirror-symmetrical about two major walls which extend from said end wall and between said side walls, the cassette can be inserted into an apparatus in either of first and second attitudes symmetrical about said axis, in the first attitude the first latching projection being in a position for engagement with an unlatching member on the apparatus, and in the second attitude said second latching projection being in a position for engagement by said member, whereby upon insertion of the cassette into said apparatus in either attitude, upon unlatching by operation of the member the cover is openable in the same direction with respect to the apparatus.

8. A magnetic-tape cassette comprising a housing having two substantially parallel major walls each having two openings for driving access to transport magnetic tape within the cassette, first and second substantially parallel side walls, and a front wall along which a length of the magnetic tape extends, a cover having a major portion and two flanges, in a closed position of the cover said major portion covering the part of the magnetic tape which extends along the front wall; and said flanges extending from said major portion parallel to and adjacent respective side walls, means for pivotally connecting said cover to said housing to open by pivotal movement about a single axis only in each of first and second opposite directions from said closed position to respective first and second open positions, in the first open position said major portion being situated near said first major wall, and in said second open position said major portion being situated near said second major wall, and means for latching the cover in the closed position, wherein said means for latching comprises a first latching projection arranged for cooperation with a first slot, adjacent said first side wall, and a second latching projection and corresponding second slot adjacent said second side wall, each said latching projection being movable into and out of the respective slot in a direction generally parallel to said axis, from an inserted position to an unlatched position, said slots each being concentric about said axis and each extending from a respective first end to a respective second end, arranged such that in the closed position of the cover each latching projection is aligned with the first end of the respective slot, and the slots extend in opposite angular directions about said axis, whereby when the cover is in the closed position and the projections are each in the inserted position, the cover is latched against pivoting in either direction, and when the first latching projection is moved to its unlatched position the cover is free to open in the first direction only, the second latching projection and its respective slot being relatively movable between the respective first and second ends; and when only the second latching projection is moved to its unlatched position the cover is free to open in the second direction only.

9. A cassette as claimed in claim 8, wherein each latching projection is resiliently connected to the housing and is biased toward the inserted position; and each slot is part of a respective flange of the cover.

10. A cassette as claimed in claim 9, wherein each flange further comprises a recess angularly spaced from the respective first end in a direction opposite the respective slot, arranged such that when the cover is fully opened in the first direction the first latching projection is aligned with the corresponding recess, and upon movement of the first latching projection to the inserted position, the cover is latched open; and when the cover is fully opened in the second direction, the second latching projection is aligned with its corresponding recess, and upon movement of the second latching projection to the inserted position, the cover is latched open.

11. A cassette as claimed in claim 10, wherein each respective latching projection is moved from its inserted to its unlatched position by depressing it inward.

12. A cassette as claimed in claim 11, comprising first and second resilient tabs each connected to a respective side wall, each latching projection being formed near a free end of a respective tab.

13. A cassette as claimed in claim 12, wherein each tab comprises an actuating element which projects from a plane tangent to the respective side wall.

14. A cassette as claimed in claim 13, wherein each tab is elongated in a direction parallel to the two major walls, and is connected to the respective side wall at an end remote from the latching projection.

15. A cassette as claimed in claim 11, wherein said cassette is mirror-symmetrical about two major walls which extend from said end wall and between said side walls, the cassette can be inserted into an apparatus in either of first and second attitudes symmetrical about said axis, in the first attitude the first latching projection being in a position for engagement with an unlatching member on the apparatus, and in the second attitude said second latching projection being in a position for engagement by said member, whereby upon insertion of the cassette into said apparatus in either attitude, upon unlatching by operation of the member the cover is openable in the same direction with respect to the apparatus.

16. A cassette as claimed in claim 15, wherein each slot extends over an arc of approximately 90°, so that the cover can open by approximately 90° movement in either direction, each recess being diametrically opposite the respective second end of the slot.

17. A cassette as claimed in claim 16, characterized in that each cover flange has a semicircular end portion, the slot and the recess of each cover flange extending radially outwardly to said end portion.

18. A cassette as claimed in claim 9, wherein said cassette is mirror-symmetrical about two major walls which extend from said end wall and between said side walls, the cassette can be inserted into an apparatus in either of first and second attitudes symmetrical about said axis, in the first attitude the first latching projection being in a position for engagement with an unlatching member on the apparatus, and in the second attitude said second latching projection being in a position for engagement by said member, whereby upon insertion of the cassette into said apparatus in either attitude, upon unlatching by operation of the member the cover is openable in the same direction with respect to the apparatus.

19. A cassette as claimed in claim 9, wherein each flange further comprises a recess angularly spaced from the respective first end in a direction opposite the respective slot, arranged such that when the cover is fully opened in the first direction the first latching projection is aligned with the corresponding recess, and upon movement of the first latching projection to the inserted position, the cover is latched open; and when the cover is fully opened in the second direction, the second latching projection is aligned with the corresponding recess, and upon movement of the second latching projection to the inserted position, the cover is latched open.

20. A cassette as claimed in claim 8, wherein said cassette is mirror-symmetrical about two major walls which extend from said end wall and between said side walls, the cassette can be inserted into an apparatus in either of first and second attitudes symmetrical about said axis, in the first attitude the first latching projection being in a position for engagement with an unlatching member on the apparatus, and in the second attitude said second latching projection being in a position for engagement by said member, whereby upon insertion of the cassette into said apparatus in either attitude, upon unlatching by operation of the member the cover is openable in the same direction with respect to the apparatus.

* * * * *